(12) United States Patent
Jiang et al.

(10) Patent No.: US 11,853,500 B2
(45) Date of Patent: Dec. 26, 2023

(54) TOUCH SUBSTRATE AND TOUCH DEVICE

(71) Applicants: Hefei Xinsheng Optoelectronics Technology Co., Ltd., Anhui (CN); BOE TECHNOLOGY GROUP CO., LTD., Beijing (CN)

(72) Inventors: Yu Jiang, Beijing (CN); Ting Zeng, Beijing (CN); Huan Liu, Beijing (CN); Haifeng Hu, Beijing (CN); Heren Gui, Beijing (CN); Yongfei Li, Beijing (CN); Jian Yang, Beijing (CN)

(73) Assignees: Hefei Xinsheng Optoelectronics Technology Co., Ltd., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/771,916

(22) PCT Filed: Jul. 12, 2021

(86) PCT No.: PCT/CN2021/105713
§ 371 (c)(1),
(2) Date: Apr. 26, 2022

(87) PCT Pub. No.: WO2022/042082
PCT Pub. Date: Mar. 3, 2022

(65) Prior Publication Data
US 2022/0397998 A1 Dec. 15, 2022

(30) Foreign Application Priority Data
Aug. 27, 2020 (CN) .......................... 202010882334.1

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 2203/04107* (2013.01)

(58) Field of Classification Search
None
See application file for complete search history.

(56) References Cited

U.S. PATENT DOCUMENTS

| 5,149,674 A | 9/1992 | Freeman, Jr. et al. |
| 5,248,903 A | 9/1993 | Heim |
(Continued)

FOREIGN PATENT DOCUMENTS

| CN | 1770437 A | 5/2006 |
| CN | 103399670 A | 11/2013 |
(Continued)

OTHER PUBLICATIONS

China Patent Office, First Office Action dated Mar. 11, 2023 for application No. CN202010882334.1.

*Primary Examiner* — Krishna P Neupane
(74) *Attorney, Agent, or Firm* — HOUTTEMAN LAW LLC

(57) ABSTRACT

A touch substrate includes: a substrate, which includes a touch area and a bonding area on one side of the touch area; and a plurality of pads on the substrate, wherein the plurality of pads are arranged in the bonding area at intervals, wherein the pad includes a first metal layer, a first organic layer and a second metal layer, arranged in this order on the substrate, a first via is formed in the first metal layer, a second via is formed in the first organic layer, an orthographic projection of the first via on the substrate and an orthographic projection of the second via on the substrate do not overlap, a part of the first organic layer is in the first via, and a part of the second metal layer is in contact with the first metal layer through the second via.

20 Claims, 3 Drawing Sheets

(56) References Cited

U.S. PATENT DOCUMENTS

| | | | | |
|---|---|---|---|---|
| 2006/0091536 | A1* | 5/2006 | Huang | H01L 24/48 |
| | | | | 257/734 |
| 2013/0161664 | A1 | 6/2013 | Tajima et al. | |
| 2015/0009422 | A1* | 1/2015 | Tung | G06F 3/0443 |
| | | | | 349/12 |
| 2015/0355747 | A1* | 12/2015 | Lin | G06F 3/04164 |
| | | | | 345/174 |
| 2019/0129535 | A1* | 5/2019 | Choi | G06F 3/044 |

FOREIGN PATENT DOCUMENTS

| | | |
|---|---|---|
| CN | 206618919 U | 11/2017 |
| CN | 109256490 A | 1/2019 |
| CN | 112015299 A | 12/2020 |
| JP | S6159855 A | 3/1986 |

\* cited by examiner

TOUCH SUBSTRATE AND TOUCH DEVICE

The present application claims the priority of the Chinese Patent Application No. 202010882334.1 entitled "touch substrate and touch device" filed on Aug. 27, 2020.

TECHNICAL FIELD

The present disclosure relates to the technical field of touch, and in particular, to a touch substrate and a touch device.

BACKGROUND

A capacitive touch screen includes a touch area and a bonding area, wherein the touch area is provided with a plurality of driving electrodes and a plurality of sensing electrodes, which are mutually crossed, forming capacitors where the plurality of driving electrodes and the plurality of sensing electrodes are crossed. Each driving electrode applies a driving signal in a scanning manner, and a corresponding sensing signal is generated at the sensing electrode. When a touch occurs, the sensing signal of the sensing electrode at a touch position changes, so that the touch position is determined according to the change of the sensing signal. The bonding area is provided with a plurality of pads, and a driving chip provides the driving electrode with the driving signal through the pad and receives the sensing signal of the sensing electrode through the pad.

In a touch screen, a problem of poor adhesion between film layers of the pad is easy to occur.

SUMMARY

The present disclosure is directed to at least one of the problems of the prior art, and provides a touch substrate and a touch device.

In order to achieve the above object, the present disclosure provides a touch substrate, including:
  a substrate, which includes a touch area and a bonding area on one side of the touch area; and
  a plurality of pads on the substrate, wherein the plurality of pads are arranged in the bonding area at intervals,
  wherein each of the plurality of pads includes a first metal layer, a second metal layer and a first organic layer, the first metal layer is between the second metal layer and the substrate, the first organic layer is between the first metal layer and the second metal layer, at least one first via is formed in the first metal layer, at least one second via is formed in the first organic layer, an orthographic projection of the at least one first via on the substrate and an orthographic projection of the at least one second via on the substrate do not overlap, a part of the first organic layer is in the at least one first via, and a part of the second metal layer is in contact with the first metal layer through the at least one second via.

In some embodiments, a surface of the second metal layer away from the substrate includes a first area and a second area,
  the touch substrate further includes a cover layer, which is located on a side of the pad away from the substrate, and the cover layer covers the first area of the second metal layer and a spacing area between the pads, and exposes the second area of the second metal layer.

In some embodiments, the first area surrounds the second area.

In some embodiments, a distance between a boundary of the second area and a boundary of the second metal layer is 0.1 to 0.25 times a width of the pad.

In some embodiments, the cover layer is a second organic layer.

In some embodiments, the cover layer includes a buffer layer and a second organic layer, which are stacked together, the second organic layer is arranged on a side of the buffer layer away from the substrate, and an orthographic projection of the buffer layer on the substrate overlaps an orthographic projection of the second organic layer on the substrate.

In some embodiments, in each of the plurality of pads, the at least one first via includes a plurality of first vias, and the at least one second via includes a plurality of second vias.

In some embodiments, the at least one first via and the at least one second via each have an aperture in a range of 20 μm to 200 μm.

In some embodiments, an orthographic projection of the second metal layer on the substrate covers and exceeds an orthographic projection of the first metal layer on the substrate.

In some embodiments, the touch substrate further includes a light shielding layer in the bonding area, wherein the pad is on a side of the light shielding layer away from the substrate.

An embodiment of the present disclosure further provides a touch device, which includes the touch substrate in the above embodiment.

BRIEF DESCRIPTION OF DRAWINGS

The accompanying drawings, which are included to provide a further understanding of the present disclosure and constitute a part of this specification, serve to explain the present disclosure together with the following detailed description, but do not constitute a limitation of the present disclosure. In the drawings.

DETAIL DESCRIPTION OF EMBODIMENTS

The embodiments of the present disclosure will be described in detail below with reference to the accompanying drawings. It should be understood that the embodiments described herein are only intended to illustrate and explain the present disclosure, but not to limit the present disclosure.

In order to make the objects, technical solutions and advantages of the embodiments of the present disclosure more apparent, the technical solutions of the embodiments of the present disclosure will be clearly and completely described below with reference to the drawings of the embodiments of the present disclosure. Obviously, the described embodiments are some, but not all, embodiments of the present disclosure. All other embodiments, which can be derived by one of ordinary skill in the art from the described embodiments of the present disclosure without creative efforts, are within the protection scope of the present disclosure.

The term used herein to describe embodiments of the present disclosure is not intended to limit and/or define the scope of the present disclosure. For example, unless otherwise defined, a technical or scientific term used herein shall have the ordinary meaning as understood by one of ordinary skill in the art to which the present disclosure belongs. It should be understood that the terms "first", "second", and the like, as used in the present disclosure, do not denote any order, quantity, or importance, but rather are used to distinguish one element from another. The singular form "a", "an", or "the" and the like does not denote a limitation of quantity, but rather denotes the presence of at least one, unless the context clearly indicates otherwise. The word "comprising" or "comprises", and the like, means that the element or item appearing in front of the word "comprising" or "comprises" includes the element or item listed after the word "comprising" or "comprises" and its equivalents, and does not exclude other elements or items. The term "connected" or "coupled" and the like is not restricted to a physical or mechanical connection, but may include an electrical connection, whether direct or indirect. The terms "upper", "lower", "left", "right", and the like are used merely to indicate relative positional relationships, which may also change accordingly when the absolute position of the object being described changes.

In the following description, when an element or layer is referred to as being "on" or "connected to" another element or layer, it may be directly on, connected to, or intervening elements or layers may be present. However, when an element or layer is referred to as being "directly on" or "directly connected to" another element or layer, there are no intervening elements or layers present. The term "and/or" includes any and all combinations of one or more of the associated listed items.

Figure 1:
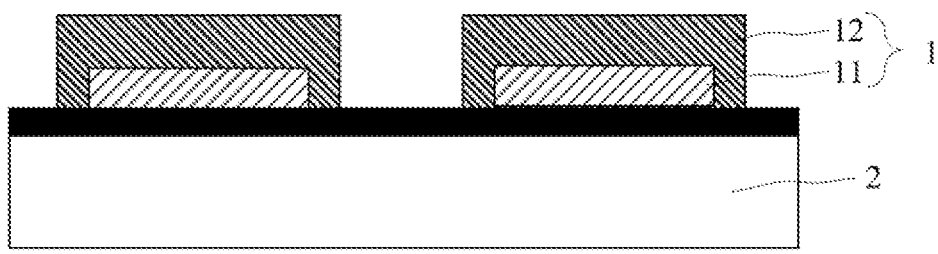
FIG. 1 is a schematic diagram of a structure of a pad of a touch substrate provided in a comparative embodiment.

FIG. 1 is a schematic diagram of a structure of a pad of a touch substrate provided in a comparative embodiment. As shown in FIG. 1, the touch substrate adopts a One Glass Solution (OGS) technology, wherein a driving electrode, a sensing electrode and a pad 1 are fabricated on a glass substrate 2. The pad 1 includes a first metal layer 11 and a second metal layer 12, the first metal layer 11 is connected to the driving electrode in the touch area through a signal line, and the second metal layer 12 is connected to the sensing electrode in the touch area through a signal line. In the manufacturing process of the pad, due to an influence of a manufacturing process and different time for manufacturing the film layers, as well as an influence of materials of the film layers, an adhesion between the film layers is prone to be poor. For example, when a pattern of the first metal layer 11 is formed, a patterning process, a cleaning treatment and a heat treatment need to be performed. After the patterning process, the cleaning treatment and the heat treatment, hydrogen bonds may be generated, and a crystal lattice becomes large in the first metal layer 11, so that when the second metal layer 12 is formed subsequently, the crystal lattices of the first metal layer 11 and the second metal layer 12 are not matched, and the adhesion between the first metal layer 11 and the second metal layer 12 is poor.

Figure 2:
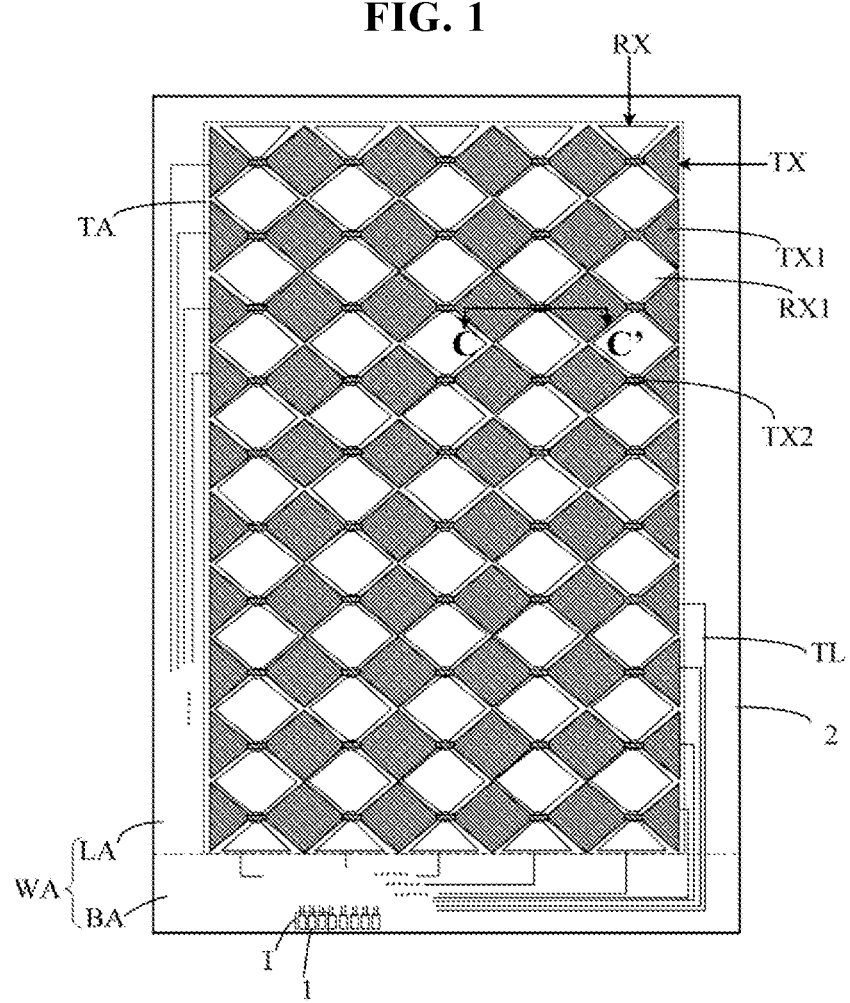
FIG. 2 is a plan view of a touch substrate provided in some embodiments of the present disclosure.
Figure 3:
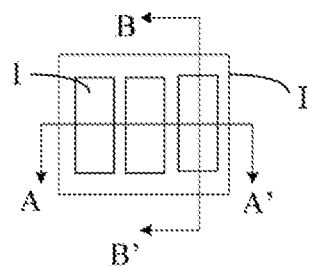
FIG. 3 is a schematic diagram of a part of a region I in FIG. 2 provided in some embodiments of the present disclosure.

FIG. 2 is a plan view of a touch substrate provided in some embodiments of the present disclosure, and FIG. 3 is a schematic diagram of a part of a region I in FIG. 2. As shown in FIG. 2, the touch substrate includes a substrate 2, a plurality of pads 1 disposed on the substrate 2, a plurality of driving electrodes TX and a plurality of sensing electrodes RX disposed on the substrate 2.

The substrate 2 includes a touch area TA and a bonding area BA located on one side of the touch area TA. The touch substrate in the embodiments of the present disclosure may be used in a touch display device, in which case the touch area TA may correspond to a display area of a display panel. Alternatively, the substrate 2 may further include a wiring area LA, which is connected to the bonding area BA to form a frame area WA surrounding the touch area TA. In some examples, the substrate 2 may be made of glass, or a flexible material such as Polyimide (PI).

The plurality of driving electrodes TX and the plurality of sensing electrodes RX are disposed in the touch area TA, and the driving electrodes TX and the sensing electrodes RX are insulated from each other and disposed at intervals. The pads 1 are disposed in the bonding area BA, and the pads 1 are intended to bond to a Flexible Print Circuit Board (FPCB). The flexible printed circuit board is electrically connected to an external driving chip and is configured to transmit signals or power from the external driving chip. The pads 1 are configured to transmit driving signals of the driving chip to the driving electrodes TX through signal lines, respectively, and configured to transmit signals sensed by the sensing electrodes RX to the driving chip, respectively. The number the pads 1 and how to arrange the pads are not particularly limited in the present disclosure, and may be set according to actual needs.

Figure 4:
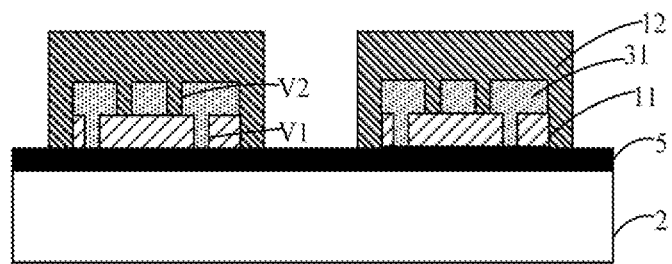
FIG. 4 is a sectional view taken along a line A-A' in FIG. 3.
Figure 5:
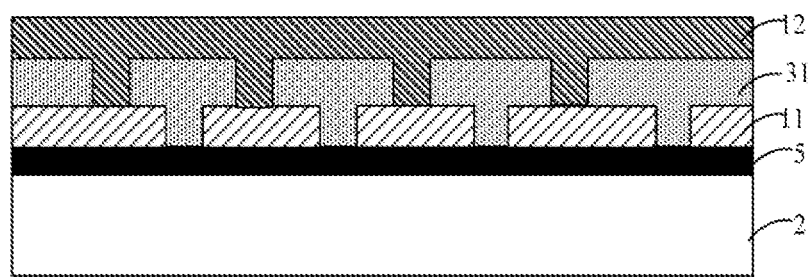
FIG. 5 is a sectional view taken along a line B-B' in FIG. 3.

FIG. 4 is a sectional view taken along a line A-A' in FIG. 3, and FIG. 5 is a sectional view taken along a line B-B' in FIG. 3. As shown in FIGS. 4 and 5, the pad 1 includes a first metal layer 11, a second metal layer 12 and a first organic layer 31, the first metal layer 11 is disposed between the second metal layer 12 and the substrate 2, and the first organic layer 31 is disposed between the first metal layer 11 and the second metal layer 12. For example, the materials of the first and second metal layers 11 and 12 may each include any one or any combination of copper, aluminum, silver, and molybdenum. The first organic layer 31 may be disposed in a same layer as an insulating spacer layer between the driving electrode TX and the sensing electrode RX, for example, the first organic layer 31 and the insulating spacer layer are both made of a transparent organic material, for example, the transparent organic material may be photoresist.

Alternatively, one of the first metal layer 11 and the second metal layer 12 is connected to the driving electrode TX through a signal line TL, and the other of the first metal layer 11 and the second metal layer 12 is connected to the sensing electrode RX through a signal line TL.

Figure 6:
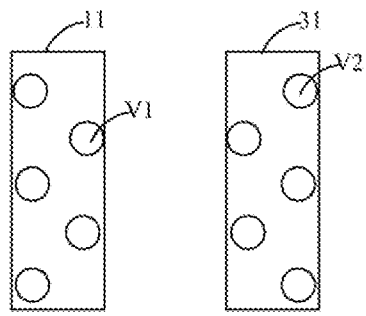
FIG. 6 is a schematic diagram of vias in a first metal layer and a second metal layer provided in some embodiments of the present disclosure.

A first via V1 is disposed in the first metal layer 11, a second via V2 is disposed in the first organic layer 31. FIG. 6 is a schematic diagram of vias in the first metal layer and the second metal layer provided in some embodiments of the present disclosure, and as shown in FIG. 4 to FIG. 6, an orthographic projection of the first via V1 on the substrate 2 does not overlap an orthographic projection of the second via V2 on the substrate 2. A part of the first organic layer 31 is located in the first via V1 so as to be in contact with the substrate 2 or other film layer under the pad 1. A part of a second metal layer 12 is in contact with the first metal layer 11 through the second via V2.

As described above, in the manufacturing process of the pad 1, due to the influence of the manufacturing process and the different time for manufacturing the film layers, as well as the influence of the materials of the film layers, the adhesion between the first metal layer 11 and the second metal layer 12 is poor when the two layers are in direct contact with each other. While in the embodiment of the present disclosure, at a position of the second via V2 in the first organic layer 31, the second metal layer 12 is in direct contact with the first metal layer 11 through the second via V2 in the first organic layer 31, and at other positions of the first organic layer 31, the second metal layer 12 is attached to the first organic layer 31, a part of the first organic layer 31 is directly attached to an upper surface of the first metal layer 11, and another part of the first organic layer 31 is located in the first via V1 in the first metal layer 11, so as to be attached to a sidewall of the first via V1 and other film layer under the pad 1. Compared with the position where the first metal layer 11 is in direct contact with the second metal layer 12, there is no problem of lattice match between the first organic layer 31 and the first metal layer 11 and between the second organic layer 42 and the second metal layer 12, the adhesion between the first organic layer 31 and the first metal layer 11 and between the second organic layer 42 and the second metal layer 12 is larger than that between the first metal layer 11 and the second metal layer 12. The first vias V1 and the second vias V2 are staggered, so that the first metal layer 11, the second metal layer 12 and the first organic layer 31 form a "bite" structure, and as a whole, the total contact area among the first organic layer 31, the first metal layer 11 and the second metal layer 12 is increased, thereby increasing the adhesion between the film layers, and improving the firmness of the pad 1.

The touch substrate further includes a light shielding layer 5 arranged in the bonding area BA, and the pad 1 is arranged on a side of the light shielding layer 5 away from the substrate 2. The light shielding layer 5 may cover the entire frame area, thereby shielding the wiring in the frame area. A part of the first organic layer 31 is in contact with the light shielding layer 5 through the first via V1. For example, the light shielding layer 5 may be made of an organic insulating material such as polyimide, polyamide, acrylic resin, benzocyclobutene, or phenol resin. The adhesion between the first organic layer 31 and the light shielding layer 5 is greater than the adhesion between the first metal layer 11 and the light shielding layer 5, thereby increasing the adhesion of the pad 1 as a whole on the substrate 2.

In some embodiments, as shown in FIG. 6, each pad 1 are provided with a plurality of first vias V1 and a plurality of second vias V2, so as to further improve adhesion between the first organic layer 31 and the first metal layer 11, between the first organic layer 31 and the second metal layer 12, and between the entire pad 1 and the light shielding layer 5.

The shapes of the first via V1 and the second via V2 are not particularly limited in the embodiment of the present disclosure. For example, the first via V1 and the second via V2 may be cylindrical vias, or triangular prism-shaped and quadrangular prism-shaped vias.

In some examples, an edge of the orthographic projection of the first metal layer 11 on the substrate 2 is rectangular, and an edge of the first organic layer 31 coincides with the edge of the first metal layer 11. An aperture of the first via V1 and an aperture of the second via V2 are both in a range of 20 μm to 200 μm, so that an electric connection between the second metal layer 12 and the first metal layer 11 and a connection effect between the first organic layer 31 and the light shielding layer 5 are ensured, and a resistance of the pad 1 is prevented from being overlarge due to the overlarge vias. It should be understood that the aperture of each of the first via V1 and the second via V2 should not exceed a width of the first metal layer 11. For example, the width of the first metal layer 11 is 120 μm, and the aperture of the first via V1 and the aperture of the second via V2 are both 40 μm.

In some embodiments, the orthographic projection of the second metal layer 12 on the substrate 2 covers and exceeds the orthographic projection of the first metal layer 11 on the substrate 2, so that the second metal layer 12 can cover the side surfaces of the first metal layer 11 and the first organic layer 31, and the connection between the film layers of the pad 1 is tighter.

Figure 7:
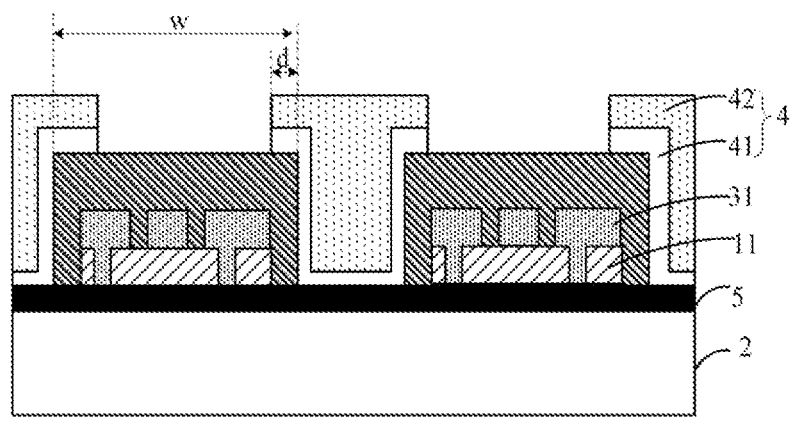
FIG. 7 is a sectional view of another pad provided in some embodiments of the present disclosure.

FIG. 7 is another sectional view along the line A-A' in FIG. 3 provided in some embodiments of the present disclosure. As shown in FIG. 7, a surface of the second metal layer 12 away from the substrate 2 includes a first area and a second area. The touch substrate further includes a cover layer 4, which is located on a side of the pad 1 away from the substrate 2, the cover layer 4 covers the first area of the second metal layer 12 and a spacing area between the pads 1, and exposes the second area of the second metal layer 12, and the second area is an area of the second metal layer 12 to be bonded with the flexible printed circuit board. By providing the cover layer 4, the entire pad 1 can be pressed onto the substrate 2, thereby further improving the firmness of the pad 1.

In some embodiments, the first area is an annular area surrounding the second area. That is, four sides of the second metal layer 12 are covered by the cover layer 4, so as to improve the pressing effect of the cover layer 4 on the pad 1 and improve the firmness of the pad 1.

Alternatively, a distance d between a boundary of the second area and a boundary of the second metal layer 12 is 0.1 to 0.25 times the width w of the pad 1. Therefore, while ensuring that the cover layer 4 has a good pressing effect on the pad 1, it is ensured that the surface of the pad 1 has a sufficient area to be bonded with the flexible circuit board.

Alternatively, the cover layer 4 includes a buffer layer 41 and a second organic layer 42, the second organic layer 42 is arranged on a side of the buffer layer 41 away from the substrate 2, an orthogonal projection of the buffer layer 41 on the substrate 2 overlaps an orthogonal projection of the second organic layer 42 on the substrate 2. The buffer layer 41 may be an inorganic material layer of silicon oxide (SiOx), silicon nitride (SiNx), silicon oxynitride (SiON), or the like, and may be formed in multiple layers or a single layer. For example, the buffer layer 41 is a silicon oxynitride layer. The second organic layer 42 may be made of a same material as the first organic layer 31. The cover layer 4 may extend to the touch area, so that the buffer layer 41 and the second organic layer 42 are also formed in the touch area, and the buffer layer 41 may prevent the electrodes of the touch substrate being damaged by the electrostatic charges occurring during the manufacturing process, and is favorable for improving an appearance color of the touch area.

Alternatively, the cover layer 4 may not include the buffer layer 41 in FIG. 7 and only include the second organic layer 42.

Figure 8:
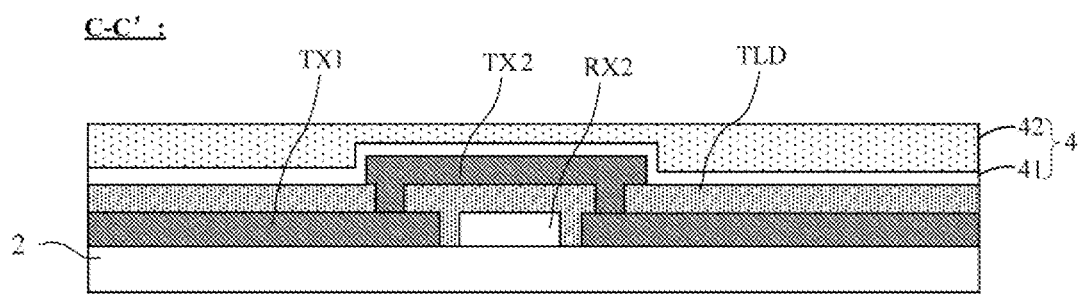
FIG. 8 is a sectional view taken along a line C-C' in FIG. 2.

FIG. 8 is a sectional view taken along a line C-C' in FIG. 2. As shown in FIG. 8, the driving electrode TX includes: a plurality of driving electrode units TX1 arranged in a first direction, and bridge parts TX2 connected between every two adjacent driving electrode units TX1 of the plurality of driving electrode units TX1. The sensing electrode RX includes: a plurality of sensing electrode units RX1 arranged in a second direction, and connection parts RX2 connected to every two adjacent sensing electrode units RX1 of the plurality of sensing electrode units RX1. The first direction and the second direction are crossed, the driving electrode unit TX1 and the sensing electrode RX are both located between the insulating spacer layer TLD and the substrate 2 and are arranged in a same layer, and the bridge part TX2 is located on a side of the insulating spacer layer TLD away from the substrate 2. For example, the first direction is a left-right direction in FIG. 2, and the second direction is an up-down direction in FIG. 2. It should be noted that the touch driving electrodes TX and the touch sensing electrodes RX shown in FIG. 2 and FIG. 8 are only exemplary and do not limit the present disclosure. For example, the connection part RX2 may be located on a side of the insulating spacer layer TLD away from the substrate 2, and the bridge part TX2 may be located on a side of the insulating spacer layer TLD close to the substrate 2. For another example, two adjacent driving electrode units TX1 may connected by the connection part RX2 provided in a different layer from the driving electrode unit TV1, and two adjacent sensing electrode units RX1 may be connected by the bridge part TX2 in a same layer as the sensing electrode unit RX1.

For example, both the driving electrode unit TX1 and the sensing electrode unit RX1 may be transparent electrodes, or both the driving electrode unit TX1 and the sensing electrode unit RX1 may be metal mesh electrodes. The bridge part TX2 may be made of a same material as the driving electrode unit TX1, and the connection part RX2 may be made of a metal material.

In some examples, the driving electrode unit TX1, the sensing electrode unit RX1 and the connection part RX2 may be all made of a same metal material as the first metal layer 11, and the bridge part TX2 may be made of a same metal material as the second metal layer 12, so that in the manufacturing process of the touch substrate, the driving electrode unit TX1, the sensing electrode unit RX1, the connection part RX2 and the first metal layer 11 can be formed simultaneously, and the bridge part TX2 and the second metal layer 12 can be formed simultaneously, thereby simplifying the manufacturing process.

For example, the first organic layer 31 in the bonding area BA and the insulating spacer layer TLD in the touch area TX may be disposed in a same layer, and the cover layer 4 may extend to the touch area TX and cover the driving electrode TX and the sensing electrode RX, so as to protect the driving electrode TX and the sensing electrode RX from being damaged.

A process for manufacturing the touch substrate shown in FIG. 7 will be described in the following.

First, a light shielding material layer is formed on a cleaned substrate 2, and the light shielding material layer is exposed and developed, thereby obtaining the light shielding layer 5.

Then, a first metal material layer is formed, and a photolithography patterning process is performed on the first metal material layer to form a pattern including the first metal layers 11 of the plurality of pads 1. Each first metal layer 11 has a plurality of first vias V1.

Then, a first organic material layer is formed, and is exposed and developed to obtain the first organic layer 31, which has a plurality of second vias V2.

And then, a second metal material layer is formed, and a photolithography patterning process is performed on the second metal material layer to form a pattern including the second metal layers 12 of the plurality of pads 1.

Finally, a second organic material layer is formed, and is exposed and developed, so that the second organic layer 42 is obtained. The second organic layer 42 exposes the second area of the second metal layer 12.

Figure 9:
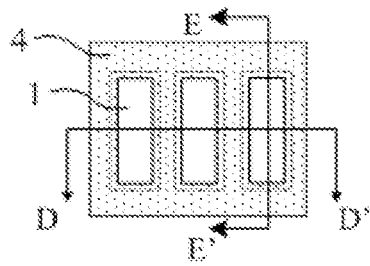
FIG. 9 is a schematic diagram of a part of a region I in FIG. 2 provided in other embodiments of the present disclosure.

FIG. 9 is a schematic diagram of a part of a region I in FIG. 2 provided in other embodiments of the present disclosure. In the other embodiments of the present disclosure, the touch substrate may also include a substrate 2, a plurality of pads 1 arranged at intervals, a plurality of driving electrodes TX, and a plurality of sensing electrodes RX. In addition, the touch substrate further includes a cover layer 4. The pad 1, the driving electrode TX, and the sensing electrode RX are disposed on the substrate 2. The pad 1 is arranged in the bonding area BA, and the driving electrode TX and the sensing electrode RX are arranged in the touch area TX. The structures of the driving electrode TX and the sensing electrode RX may refer to the descriptions in the above embodiments.

Figure 10:
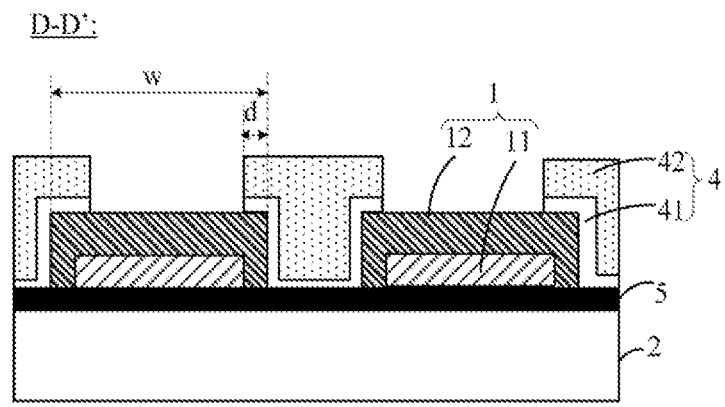
FIG. 10 is a sectional view taken along a line D-D' in FIG. 9.
Figure 11:
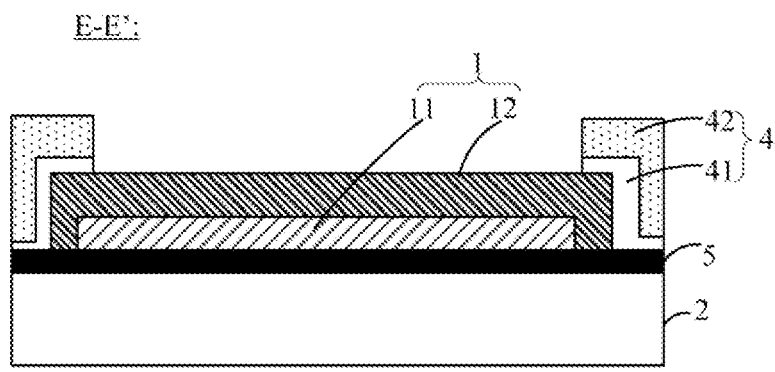
FIG. 11 is a sectional view taken along a line E-E' in FIG. 9.

FIG. 10 is a sectional view taken along a line D-D' in FIG. 9, and FIG. 11 is a sectional view taken along a line E-E' in FIG. 9. As shown in FIG. 9, the pad 1 includes a first metal layer 11 and a second metal layer 12, the first metal layer 11 is arranged between the second metal layer 12 and the substrate 2, and a surface of the second metal layer 12 away from the substrate 2 includes a first area and a second area. Alternatively, an orthographic projection of the second metal layer 12 on the substrate 2 covers and exceeds an orthographic projection of the first metal layer 11 on the substrate 2.

The cover layer 4 is located on a side of the pad 1 away from the substrate 2, and the cover layer 4 covers the first area of the second metal layer 12 and a spacing area between the pads 1, and exposes the second area of the second metal layer 12.

Unlike the touch substrate shown in FIG. 7, in FIGS. 10 and 11, the pad 1 includes only the first metal layer 11 and the second metal layer 12, and the first organic layer 31 is not included to be disposed between the first metal layer 11 and the second metal layer 12. In this case, by providing the cover layer 4, the entire pad 1 can be pressed onto the substrate 2, thereby improving the firmness of the pad 1.

Similar to the touch substrate shown in FIG. 7, in FIGS. 10 and 11, the first area of the second metal layer 12 is an annular area surrounding the second area. Alternatively, the distance d between the boundary of the second area and the boundary of the second metal layer 12 may be 0.1 to 0.25 times the width w of the pad 1.

The cover layer 4 in FIG. 10 may be the same as that in FIG. 7, and may also include a buffer layer 41 and a second organic layer 42. The materials of the buffer layer 41 and the second organic layer 42 may be the same as described above.

Similar to the touch substrate shown in FIG. 7, the touch substrate shown in FIGS. 10 and 11 further includes a light shielding layer 5, and the pad 1 is disposed on a side of the light shielding layer 5 away from the substrate.

An embodiment of the present disclosure further provides a touch device, which includes the touch substrate provided in any one of the above embodiments. In addition, the touch device may be a touch display device, which further includes a display panel. The touch substrate is arranged on a light emitting side of the display panel.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and scope of the present disclosure, and these changes and modifications are to be considered within the scope of the present disclosure.

What is claimed is:

1. A touch substrate, comprising:
a substrate, which comprises a touch area and a bonding area on one side of the touch area; and
a plurality of pads on the substrate, wherein the plurality of pads are arranged in the bonding area at intervals,
wherein each of the plurality of pads comprises a first metal layer, a second metal layer and a first organic layer, the first metal layer is between the second metal layer and the substrate, the first organic layer is between the first metal layer and the second metal layer, at least one first via is formed in the first metal layer, at least one second via is formed in the first organic layer, an orthographic projection of the at least one first via on the substrate and an orthographic projection of the at least one second via on the substrate do not overlap, a part of the first organic layer is in the at least one first via, and a part of the second metal layer is in contact with the first metal layer through the at least one second via,
wherein the orthographic projection of the at least one first via on the substrate is within an orthographic projection of the pad on the substrate.

2. The touch substrate of claim 1, wherein a surface of the second metal layer away from the substrate comprises a first area and a second area,
the touch substrate further comprises a cover layer, which is located on a side of the pad away from the substrate, and the cover layer covers the first area of the second metal layer and a spacing area between the pads, and exposes the second area of the second metal layer.

3. The touch substrate of claim 2, wherein the first area surrounds the second area.

4. The touch substrate of claim 3, wherein a distance between a boundary of the second area and a boundary of the second metal layer is 0.1 to 0.25 times a width of the pad.

5. The touch substrate of claim 2, wherein the cover layer is a second organic layer.

6. The touch substrate of claim 2, wherein the cover layer comprises a buffer layer and a second organic layer, which are stacked together, the second organic layer is arranged on a side of the buffer layer away from the substrate, and an orthographic projection of the buffer layer on the substrate overlaps an orthographic projection of the second organic layer on the substrate.

7. The touch substrate of claim 1, wherein in each of the plurality of pads, the at least one first via comprises a plurality of first vias, and the at least one second via comprises a plurality of second vias.

8. The touch substrate of claim 1, wherein the at least one first via and the at least one second via each have an aperture in a range of 20 μm to 200 μm.

9. The touch substrate of claim 1, wherein an orthographic projection of the second metal layer on the substrate covers and exceeds an orthographic projection of the first metal layer on the substrate.

10. The touch substrate of claim 1, further comprising a light shielding layer in the bonding area, wherein the pad is on a side of the light shielding layer away from the substrate.

11. A touch device, comprising the touch substrate of claim 1.

12. The touch device of claim 11, wherein a surface of the second metal layer away from the substrate comprises a first area and a second area,
the touch substrate further comprises a cover layer, which is located on a side of the pad away from the substrate, and the cover layer covers the first area of the second metal layer and a spacing area between the pads, and exposes the second area of the second metal layer.

13. The touch device of claim 12, wherein the first area surrounds the second area.

14. The touch device of claim 13, wherein a distance between a boundary of the second area and a boundary of the second metal layer is 0.1 to 0.25 times a width of the pad.

15. The touch device of claim 12, wherein the cover layer is a second organic layer.

16. The touch device of claim 12, wherein the cover layer comprises a buffer layer and a second organic layer, which are stacked together, the second organic layer is arranged on a side of the buffer layer away from the substrate, and an orthographic projection of the buffer layer on the substrate overlaps an orthographic projection of the second organic layer on the substrate.

17. The touch device of claim 11, wherein in each of the plurality of pads, the at least one first via comprises a plurality of first vias, and the at least one second via comprises a plurality of second vias.

18. The touch device of claim 11, wherein the at least one first via and the at least one second via each have an aperture in a range of 20 μm to 200 μm.

19. The touch device of claim 11, wherein an orthographic projection of the second metal layer on the substrate covers and exceeds an orthographic projection of the first metal layer on the substrate.

20. The touch device of claim 11, wherein the touch substrate further comprises a light shielding layer in the bonding area, and the pad is on a side of the light shielding layer away from the substrate.

* * * * *